United States Patent
Son et al.

(10) Patent No.: US 8,611,595 B2
(45) Date of Patent: Dec. 17, 2013

(54) METHOD AND TERMINAL FOR DETECTING AND TRACKING MOVING OBJECT USING REAL-TIME CAMERA MOTION ESTIMATION

(75) Inventors: Byung Jun Son, Seoul (KR); Yun Jung Kim, Seoul (KR); Sung Dae Cho, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 372 days.

(21) Appl. No.: 12/976,290

(22) Filed: Dec. 22, 2010

(65) Prior Publication Data

US 2011/0150284 A1    Jun. 23, 2011

(30) Foreign Application Priority Data

Dec. 22, 2009  (KR) .................. 10-2009-0129338

(51) Int. Cl.
*G06K 9/00*    (2006.01)

(52) U.S. Cl.
USPC ................................ 382/103; 348/208.4

(58) Field of Classification Search
USPC ......... 382/100, 103, 107, 181, 190, 195, 199;
348/207.99, 208.1, 208.4, 208.5,
348/208.6, 352, 407.1, 430, 431.1
See application file for complete search history.

(56) References Cited

U.S. PATENT DOCUMENTS

| | | | |
|---|---|---|---|
| 6,335,985 B1 * | 1/2002 | Sambonsugi et al. | 382/190 |
| 6,380,986 B1 * | 4/2002 | Minami et al. | 348/699 |
| 6,628,711 B1 * | 9/2003 | Mathew et al. | 375/240.12 |
| 7,856,120 B2 * | 12/2010 | Porikli et al. | 382/103 |
| 8,130,277 B2 * | 3/2012 | Jayachandra et al. | 348/208.1 |
| 8,311,282 B2 * | 11/2012 | Luo et al. | 382/103 |
| 8,340,185 B2 * | 12/2012 | Biswas et al. | 375/240.16 |
| 2004/0252230 A1 * | 12/2004 | Winder | 348/402.1 |

FOREIGN PATENT DOCUMENTS

| | | |
|---|---|---|
| KR | 100540889 | 1/2006 |
| KR | 1020080087589 | 10/2008 |
| WO | WO 02/09419 | 1/2002 |

OTHER PUBLICATIONS

Chien et al.: "Fast Video Segmentation Algorithm with Shadow CancellationGlobal Motion Compensation, and Adaptive Threshold Techniques", vol. 6 No. 5, Oct. 2004 (supplied by applicant, also available on Google.com).*
Chien et al.: "Fast Video Segmentation Algorithm with Shadow Cancellation, Global Motion Compensation, and Adaptive Threshold Techniques", Oct. 2004.
IEEE Transactions on Multimedia, Oct. 1, 2004.
Yilmaz et al.: "Object Tracking: A Survey", ACM Computing Surveys, Dec. 1, 2006.
Liu et al.: "New Fast Algorithms for the Estimation of Block Motion Vectors", IEEE Transactions on Circuits and Systems for Video Technology, Apr. 1, 1993.

* cited by examiner

*Primary Examiner* — Anand Bhatnagar
(74) *Attorney, Agent, or Firm* — The Farrell Law Firm, P.C.

(57) ABSTRACT

A method is provided for detecting and tracking a moving object using real-time camera motion estimation, including generating a feature map representing a change in an input pattern in an input image, extracting feature information of the image, estimating a global motion for recognizing a motion of a camera using the extracted feature information, correcting the input image by reflecting the estimated global motion, and detecting a moving object using the corrected image.

18 Claims, 4 Drawing Sheets

METHOD AND TERMINAL FOR DETECTING AND TRACKING MOVING OBJECT USING REAL-TIME CAMERA MOTION ESTIMATION

PRIORITY

This application claims priority under 35 U.S.C. §119(a) to a Korean Patent Application filed in the Korean Intellectual Property Office on Dec. 22, 2009 and assigned Serial No. 10-2009-0129338, the entire disclosure of which is incorporated herein by reference.

BACKGROUND OF THE INVENTION

1. Field of the Invention

The present invention relates generally to a method and apparatus for detecting and tracking a moving object in an image in a portable terminal

2. Description of the Related Art

For many applications such as computer vision and object recognition, robotics, surveillance systems, unmanned vehicle systems, and the like, much study has been conducted on a technology of automatically detecting and tracking a moving object in continuous images acquired from a camera. The technology of detecting and tracking a moving object in images is typically classified into a scheme using template matching, and a scheme of detecting and tracking a moving object in images corrected by correcting for motion of a camera. The template matching-based scheme manually selects, i.e., allows a user to directly select, an object to be tracked in a frame received through a camera, sets some selected areas as templates, tracks an area having the highest similarity in the next frame by template matching, and determines the highest-similarity area as an area of a moving object.

The scheme of detecting and tracking a moving object in images corrected by correcting for motion of a camera, divides a frame received through the camera into several blocks, extracts feature information from each block, estimates a local motion using the extracted feature information, removes an outlier increasing motion estimation error to estimate a global motion based on the estimated local motion information, and estimates the global motion using the outlier-removed feature information. The scheme then calculates different motion information of a moving object and a background in continuous images, in which the motion of the camera is corrected, using features of the images, and separates the moving object from the background.

However, these moving object detecting and tracking schemes have several problems. The scheme of manually selecting an area of an object and tracking the area of the object by determining its similarity based on template matching is inconvenient and may continue to track a part of a non-moving object if it fails in template matching. Additionally, if a moving object is out of a preview area of the camera, this scheme cannot track the moving object and must newly select the moving object. Moreover, if a size of the selected moving object is large, the computing speed is low during template matching, leading to a delay of a preview frame being input to the camera.

Next, the scheme of correcting motion of a camera by estimating a local motion and a global motion and then detecting a moving object using features of images, generally uses a method of estimating motion based on features of images, considering the speed, and the features of images refer to edges of objects, boundaries of areas, intersections of lines, etc. To extract feature information, a Harris corner detection method or a Kansde-Lucas-Tomasi (KLT) edge detection method is commonly used, and the edge detection method may be classified into Sobel, Canny and Laplace edge detection schemes. It may not be possible for these various feature information extraction methods to be carried out in real-time in electronic devices having limited storage capacity and arithmetic processing capability, like cell phones. In some cases, considering the speed, input images should be down-sampled to a low resolution during their processing. In this case, however, the processing speed may increase, but the performance of motion estimation may decrease.

Thus, a moving object detecting and tracking method suitable for the arithmetic processing capabilities of portable terminals is required.

SUMMARY OF THE INVENTION

An aspect of the present invention is to address at least the above-mentioned problems and/or disadvantages and to provide at least the advantages described below. Accordingly, an aspect of the embodiments of the present invention is to provide a method and apparatus for detecting and tracking a moving object in an image, which is suitable for a portable terminal having limited storage capacity and arithmetic processing capability.

In accordance with one aspect of the present invention, a method is provided for detecting and tracking a moving object using real-time camera motion estimation. The method includes generating a feature map representing a change in an image pattern in an input image, and extracting feature information of the image; estimating a global motion for recognizing a motion of a camera using the estimated feature information; and correcting the input image by reflecting the estimated global motion, and detecting a moving object by comparing a previous image with a current image in the corrected input image.

In accordance with another aspect of the present invention, a terminal is provided for detecting and tracking a moving object using real-time camera motion estimation. The terminal includes a camera unit for capturing an image using a lens and an image sensor; a controller for controlling components of the terminal; and a moving object detecting and tracking unit including, a feature extractor for generating a feature map representing a change in an image pattern in an input image and extracting feature information of the image; a global motion estimator for estimating a global motion for recognizing a motion of a camera using the extracted feature information; and a moving object extractor for correcting the input image by reflecting the estimated global motion, and detecting a moving object by comparing a previous image with a current image in the corrected input image.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF THE EMBODIMENTS OF THE PRESENT INVENTION

Embodiments of the present invention will now be described in detail with reference to the accompanying drawings. In the following description, specific details such as the detailed configuration and components are merely provided to assist the overall understanding of the embodiments of the present invention. Therefore, it should be apparent to those skilled in the art that various changes and modifications of the embodiments described herein can be made without departing from the scope and spirit of the invention. Additionally, descriptions of well-known functions and constructions are omitted for clarity and conciseness.

The present invention provides a method for extracting motion information of a camera using images obtained through a camera preview, and detecting and tracking a moving object using the extracted information. The method enables an electronic device having limited storage capacity and arithmetic processing capability to extract motion information of a camera at high speed and to correct the camera motion information of continuously input preview images, making it possible to automatically accurately detect and track a moving object. To achieve fast and accurate camera motion estimation, the present invention is directed to extracting features from an area except for a candidate area of a moving object using local block information, estimating a global motion based on the extracted feature information of images, extracting an area of the moving object according to a difference image between a previous frame corrected based on the estimated camera motion information and the next frame, and to filtering thereon, and generating and tracking an appearance model using information about the moving object in previous frames. A detailed description thereof will be made below with reference to the accompanying drawings.

Figure 1:
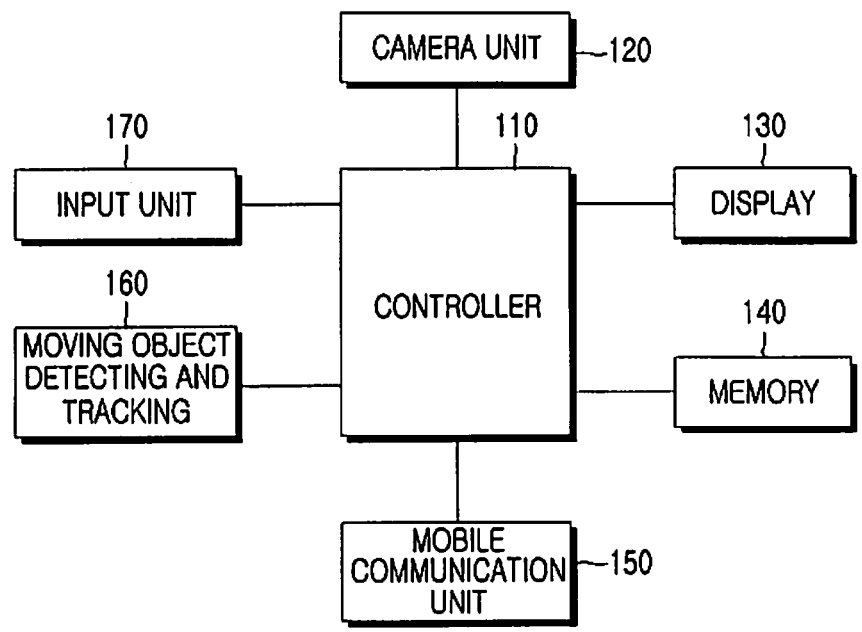
FIG. 1 is a block diagram illustrating a structure of a terminal for detecting and tracking a moving object using real-time camera motion estimation according to an embodiment of the present invention.

FIG. 1 illustrates a structure of a terminal for detecting and tracking a moving object using real-time camera motion estimation according to an embodiment of the present invention.

Referring to FIG. 1, the terminal includes a controller 110, a camera unit 120, a display 130, a memory 140, an input unit 170, a mobile communication unit 150, and a moving object detecting and tracking unit 160.

The display 130 displays various display information and messages under the control of the controller 110. The display 130 may include Liquid Crystal Display (LCD), Thin Film Transistor (TFT), Organic Electroluminescence (EL), and the like.

The input unit 170 has a plurality of alphanumeric and function keys, and outputs key input data corresponding to keys pressed or clicked by a user, to the controller 110. When in the form of a touch screen, the display 130 may serve as the input unit 170 as well.

The memory 140 includes a Read Only Memory (ROM) and a Random Access Memory (RAM) for storing a plurality of programs and data required for operation of the terminal.

The mobile communication unit 150 exchanges Radio Frequency (RF) signals with a base station via an antenna (not shown) to enable wireless communication between the terminal and the base station.

The camera unit 120 includes a lens and an image sensor to capture images.

The controller 110 controls other components of the terminal. The controller 110 performs general communication functions such as call and data transmission/reception by controlling the other components, and controls the moving object detecting and tracking unit 160 according to an embodiment of the present invention, to detect/track a moving object in images.

The moving object detecting and tracking unit 160 receives preview images through the camera unit 120, and detects and tracks a moving object in the input images in real-time.

According to an embodiment of the present invention, the moving object detecting and tracking unit 160 generates a feature map representing a change in an image pattern in input images, extracts feature information of the images, estimates a global motion for recognizing a motion of a camera using the extracted feature information, corrects the input images by reflecting the estimated global motion, and detects a moving object using the corrected images.

In this case, the moving object detecting and tracking unit 160 extracts the feature information by generating a feature map marking pixels, a change of each of which with neighbor pixels is greater than a predetermined threshold in the images. The moving object detecting and tracking unit 160 uses a Y value of YCbCr domain of pixel values when detecting a degree of change with neighbor pixels. The change degree is determined by using at least one of R, G and B in case of a pixel of RGB domain. In generating the feature map, the moving object detecting and tracking unit 160 creates a feature map in a part obtained by excepting an area of a predetermined size from the center of a first input image, and creates a feature map in the remaining part except for the extracted area of the moving object starting from a second input frame.

The moving object detecting and tracking unit 160 estimates a global motion by dividing pixel areas marked such that a change with neighbor pixels is greater than a predetermined threshold in the feature map, into feature blocks having a predetermined size of N*N, further dividing the divided feature blocks into sub-blocks having a predetermined size of S*S, setting a sum of pixel values belonging to each sub-block included in each feature block as a representative value of the sub-block, setting a sub-block having the greatest representative value among the sub-blocks as a macro block of the feature block to which the sub-block belongs, and matching macro blocks of the feature blocks obtained from the input previous image, to the current image.

The moving object detecting and tracking unit 160 detects a moving object by correcting the input previous image by reflecting the estimated global motion, removing noises by applying an averaging filter to the corrected previous image and the current image, calculating a difference image expressed in a binary signal by matching the noise-removed corrected previous image with the current image, and removing noises by applying an erosion operator to the calculated difference image.

In this case, applying an averaging filter includes setting a central pixel value of a block having a predetermined size of M*M as an average of other neighbor pixels in the difference image, and performing filtering such that M*M blocks do not overlap in the difference image.

The moving object detecting and tracking unit 160 calculates the difference image by calculating an image difference between the corrected previous image and the current image of each of brightness information and color information, and marking pixels whose image difference of brightness information is greater than a predetermined reference image difference about brightness information, or whose image difference about color information is greater than a predetermined reference image difference about color information.

The moving object detecting and tracking unit 160 detects an area of a moving object by calculating, once a first area of the moving object is calculated, a difference image only in the area whose horizontal and vertical pixel lengths are extended by a predetermined offset from the detected area of the moving object in the next input image.

The moving object detecting and tracking unit 160 tracks a moving object by generating an appearance model by accumulating the detected areas of the moving object, and if the moving object is not detected due to its stoppage, performing pattern matching in the area that is extended from the area of the moving object detected in the previous image by a predetermined offset, using the appearance model.

Figure 2:
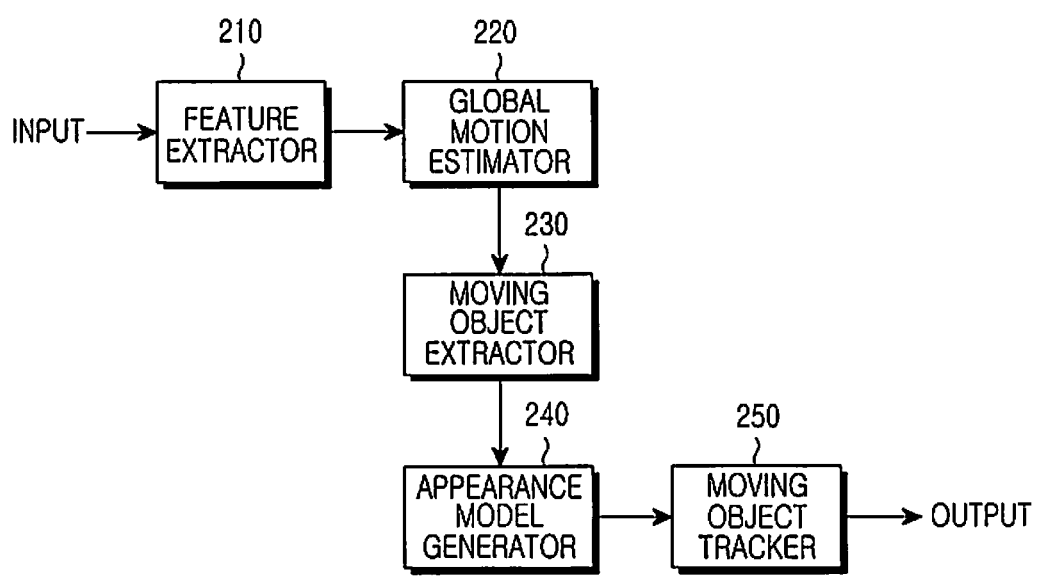
FIG. 2 is a block diagram illustrating a detailed structure of a moving object detecting and tracking unit in a terminal for detecting and tracking a moving object using real-time camera motion estimation according to an embodiment of the present invention.

FIG. 2 illustrates a detailed structure of a moving object detecting and tracking unit in a terminal for detecting and tracking a moving object using real-time camera motion estimation according to an embodiment of the present invention.

Referring to FIG. 2, the moving object detecting and tracking unit 160 of FIG. 1 includes a feature extractor 210, a global motion estimator 220, a moving object extractor 230, an appearance model generator 240, and a moving object tracker 250.

The feature extractor 210 receives a real-time image input by a user, from the camera unit 120 through the controller 110, or receives an image stored in the memory 140, and extracts features of the received image.

During moving object detecting and tracking, in order to rapidly and accurately estimate a motion of the camera, the terminal is required to extract feature information in the part with a significant change in an image pattern while minimizing the amount of feature information of input images. To meet this requirement, a feature map is generated using local block information, and a part corresponding to an effective range in the generated feature map is divided into feature blocks having a size of N*N. The term "local block information" refers to information obtained by neighbor pixels of each of pixels in an input image. For example, if local blocks are used to acquire edge or corner information, a block including a reference pixel I(i,j) and its neighbor pixels I(i−1,j) and I(i,j−1) may be used for each pixel I(i,j) of an image I. That is, a local block may include two or more neighbor pixels around a reference pixel. In a process of generating a feature map using the local bocks, the feature map is generated by using a change between a reference pixel and neighbor pixels, excluding the area with a less pattern change in the image, and setting a specific threshold Tm to obtain an effective area from the feature map. The feature map is generated using Equation (1) below:

$$M(i, j) = \begin{cases} \sum_{k=0}^{1}\left(\frac{I(i, j)-}{I(i-k, j+k-1)}\right)^2 & \text{if } \sum_{k=0}^{1}\left(\frac{I(i, j)-}{I(i-k, j+k-1)}\right)^2 > T_m \\ 0 & \text{otherwise} \end{cases} \quad (1)$$

where M(i,j) represents a value of an (i,j)-th pixel of a feature map M and $T_M$ represents the threshold.

Considering the accuracy and speed of motion estimation, a feature map is created in the remaining area except for an area of the moving object. In the first input image, since an area of the moving object cannot be known, a feature map is created in an outer portion of the image on the assumption that the moving object is located in the center of the image. That is, a feature map is created in the part obtained by excepting an area of a predetermined size from the center of the image, and a feature map is created in a remaining part except for the extracted area of the moving object starting from the second input frame.

The global motion estimator 220 estimates a global motion using the feature map created by the feature extractor 210. To estimate a global motion using the created feature map, the global motion estimator 220 divides a part having a non-zero value in the feature map into N*N blocks (hereinafter referred to as the "feature blocks"). To select a macro block used to estimate a global motion, each feature block is further divided into S*S sub-blocks. A sum of pixel values belonging to each of the divided sub-blocks is calculated and determined as a representative value of the sub-block, and a sub-block having the greatest representative value in each feature block is set as a macro block of the feature block. Having a large representative value may be construed as a significant change in an image pattern. The macro block is created using Equation (2) below:

$$M_b(F_b) = \{S_b \mid V(S_b) = \underset{S_b \subset F_b}{\text{MAX}}(V(S_b))\} \quad (2)$$

$$V(S_b) = \sum_{x \in S_b} x$$

where $M_b(F_b)$ represents a macro block of a feature block $F_b$, $S_b$ represents a sub-block of the feature block $F_b$, V(Sb) represents a sum of pixel values belonging to each of the divided sub-blocks, and x represents a pixel value.

A global motion of the camera is then estimated using the previous image $I_{t-1}$ and the current image $I_t$. The camera motion is estimated by performing block matching on the current image using the macro block created from the previous image.

The moving object extractor 230 corrects an image by reflecting camera motion information estimated by the global motion estimator 220, and detects a moving object using the corrected image. Once the camera motion is estimated, the moving object extractor 230 corrects a previous image by reflecting the estimated motion information, and then calculates a difference image of the part overlapping the current image.

Generally, to reduce the impact of noise, the difference image is calculated by applying an averaging filter or a Gaussian filter to each image. In addition to the averaging filter and the Gaussian filter, other types of filters modified from the averaging filter may also be used depending on the speed required. For example, in an averaging filter using 3×3 blocks or more, an average value of eight neighbor pixels is determined as a central pixel value of the 3×3 filter in the image. However, if this pixel operation is performed on all frames being input through a preview, the operation time may increase. Therefore, the 3×3 blocks may be filtered not to overlap each other, and not only the central pixel value in the 3×3 block but also its eight neighbor pixel values may be equally set as an average value.

In addition, if only gray images are used in detecting a moving object using a difference image, it is highly likely to fail in detecting the moving object under a background having a color similar to that of the moving object. Therefore, when the difference image is calculated, color information is used as well. For example, if the image has a format of YCbCr, a difference image is calculated using an average of not only a Y value but also Cb and Cr values, and this difference image is converted into a binary image using specific thresholds $T_Y$ and $T_{CbCr}$. The same method may be applied even in RGB or other color areas. The difference image is calculated using Equation (3) below:

$$I_Y(x) = I_{t-1}^{new}(x) - I_t(x), \quad I_{CbCr}(x) = I_{t-1}^{new}(x) - I_t(x) \quad (3)$$

$$I_B(x) = \begin{cases} 1 & \text{if } I_Y(x) > T_Y \text{ or } I_{CbCr}(x) > T_{CbCr} \\ 0 & \text{otherwise} \end{cases}$$

where $I_Y$ and $I_{CbCr}$ represent image differences in Y and CbCr areas, respectively, $I_{t-1}^{new}$ represents a previous image corrected by reflecting camera motion information, $I_B$ represents a binary difference image, and x represents coordinates in each area.

Noises of the binary difference image are then removed using an erosion operator used in morphology, and the noise-removed part is set as an area of the moving object. Once the area of the moving object is determined, to improve the processing speed, a binary difference image is calculated in some extended area including the previously determined area of the moving object in the next input image $I_{t+1}$ without the need to calculate a difference image about the entire area. The term "extended area" refers to an area obtained by extending horizontal and vertical areas of the previously detected the moving object's area by a predetermined offset, and use of the extended area makes it possible to accurately detect a moving object that moves at high speed and changes in shape as the objects move further away or closer to the camera, such as vehicles. If the moving object moves outside the bounds of the screen, the extended area for detecting a moving object is extended to the entire image.

The appearance model generator 240 generates an appearance model in case a moving object has no motion or only a slight motion. The appearance model is generated by accumulating the moving object's areas obtained in the previous frames. For the generation of the appearance model, Equation (4) below is used:

$$A_t(x) = \alpha A_{t-1}(x) + (\alpha-1)I_t(x) \text{ if } x \in R \quad (4)$$

where A represents an appearance model, R represents a moving object's area obtained at a time slot t, Alpha represents a transparency, and x represents coordinates of pixel.

The moving object tracker 250 tracks a moving object using the appearance model generated in the appearance model generator 240. The appearance model is continuously updated as the frame goes by, and if a moving object has no motion or only a slight motion at a time slot t+1, the moving object tracker 250 tracks the moving object through a pattern matching operation at around the moving object's area for a time slot t in an image $I_{t+1}$ using the appearance model obtained at the time slot t.

Figure 3:
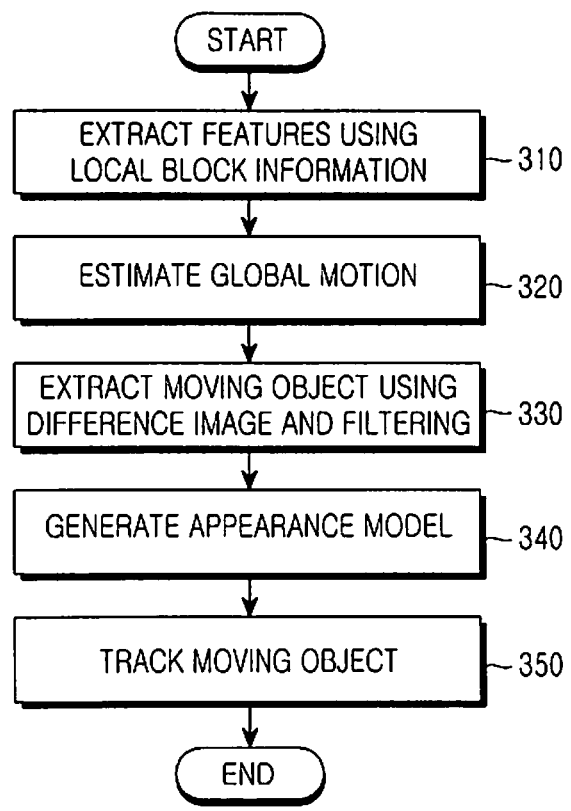
FIG. 3 is a diagram illustrating a flow of a method for detecting and tracking a moving object using real-time camera motion estimation according to an embodiment of the present invention.

FIG. 3 illustrates a flow of a method for detecting and tracking a moving object using real-time camera motion estimation according to an embodiment of the present invention.

Referring to FIG. 3, in step 310, the feature extractor 210 receives a real-time image input by a user, from the camera unit 120 of FIG. 1 through the controller 110 of FIG. 1, or receives an image stored in the memory 140 of FIG. 1, and extracts features of the received image.

In step 320, the global motion estimator 220 of FIG. 2 estimates a global motion using a feature map created by the feature extractor 210 of FIG. 2. In step 330, the moving object extractor 230 of FIG. 2 corrects an image by reflecting camera motion information extracted in the global motion estimator 220, and detects a moving object using the corrected image. In step 340, the appearance model generator 240 of FIG. 2 generates an appearance model in case that a moving object has no motion or a very slight motion. In step 350, the moving object tracker 250 of FIG. 2 tracks a moving object using the generated appearance model.

Figure 4A:
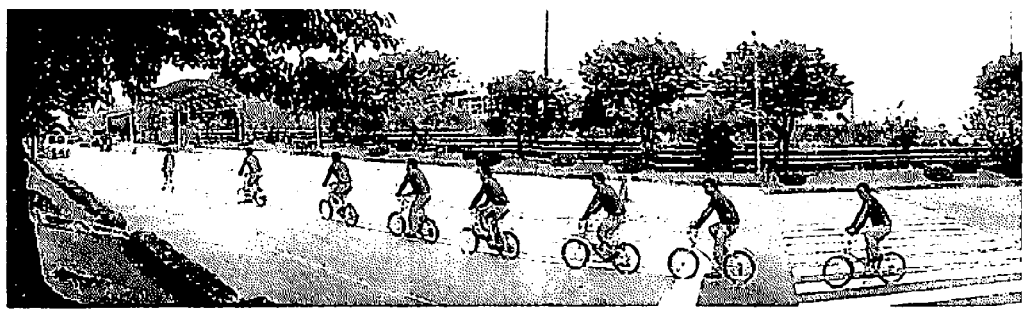
FIGS. 4A and 4B are diagrams illustrating examples of images obtained by detecting and tracking moving objects using real-time camera motion estimation according to an embodiment of the present invention.
Figure 4B:
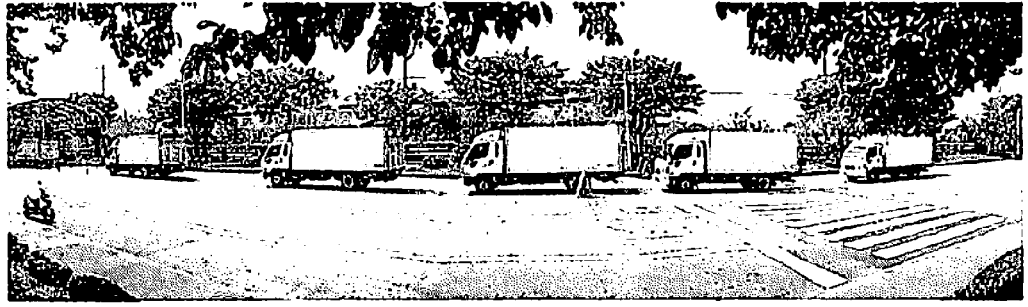

FIGS. 4A and 4B illustrate examples of images obtained by detecting and tracking moving objects using real-time camera motion estimation according to an embodiment of the present invention.

By detecting and tracking a moving object using real-time camera motion estimation according to an embodiment of the present invention, a moving object can be detected and tracked in an image in real-time, making it possible to accurately detect a motion of a moving object in an image as shown in FIG. 4.

As is apparent from the foregoing description, the present invention provides a method for extracting motion information of a camera using images obtained through a camera preview, and detecting and tracking a moving object by reflecting the extracted motion information. In particular, the present invention enables a portable terminal having limited storage capacity and arithmetic processing capability to extract camera motion information at high speed and to correct camera motion information of continuously received preview images, thereby automatically accurately detecting and tracking a moving object and improving tracking performance for a moving object using an appearance model. As a result, the moving object detecting and tracking method according to the present invention may be used in applications of synthesizing captured images.

While an operation and structure of a method and terminal for detecting and tracking a moving object using real-time camera motion estimation according to an embodiment of the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for detecting and tracking a moving object using real-time camera motion estimation, comprising:
   generating a feature map representing a change in an image pattern in an input image, and extracting feature information of the image;
   estimating a global motion for recognizing a motion of a camera using the extracted feature information; and correcting the input image by reflecting the estimated global motion, and detecting a moving object by comparing a previous image with a current image in the corrected input image, wherein generating the feature map comprises creating the feature map in a remaining part except for an extracted area of the moving object.

2. The method of claim 1, wherein generating a feature map and extracting feature information comprises:

generating a feature map marking pixels, a change of each of which with neighbor pixels is greater than a predetermined threshold in the image, and extracting the feature information from the feature map.

3. The method of claim 1, wherein generating a feature map comprises:

creating a feature map in a part obtained by excepting an area of a predetermined size from a center of a first input image, and creating a feature map in a remaining part except for an extracted area of a moving object starting from a second input image.

4. The method of claim 1, wherein estimating a global motion comprises:

dividing pixel areas marked such that a change with neighbor pixels is greater than a predetermined threshold in the feature map, into feature blocks having a predetermined size of N*N;

dividing each of the divided feature blocks into sub-blocks having a predetermined size of S*S;

setting a sum of pixel values belonging to each sub-block included in each feature block as a representative value of the sub-block, and setting a sub-block having a greatest representative value among the sub-blocks as a macro block of the feature block to which the sub-block belongs; and estimating a global motion by matching macro blocks in each feature block obtained in the previously input image, to a current image.

5. The method of claim 1, wherein correcting the input image and detecting a moving object comprise:

correcting the input previous image by reflecting the estimated global motion;

removing noises applying an averaging filter to the corrected previous image and the current image;

calculating a difference image expressed in a binary signal by matching the noise-removed corrected previous image with the current image; and detecting an area of a moving object by removing noises by applying an erosion operator to the calculated difference image.

6. The method of claim 5, wherein applying an averaging filter comprises setting a central pixel value of a block having a predetermined size of M*M to an average of other neighbor pixels in the difference image, and performing filtering such that M*M blocks do not overlap in the difference image.

7. The method of claim 5, wherein calculating a difference image comprises calculating an image difference between the corrected previous image and the current image of each of brightness information and color information, and marking pixels whose image difference of brightness information is greater than a predetermined reference image difference of brightness information, or whose image difference about color information is greater than a predetermined reference image difference about color information.

8. The method of claim 5, wherein detecting an area of a moving object comprises:

calculating a difference image only in an area whose horizontal and vertical pixel lengths are extended by a predetermined offset from the detected area of the moving object in the next input image wherein a first area of a moving object has been calculated.

9. The method of claim 5, further comprising:

generating an appearance model by accumulating the detected area of the moving object; and tracking the moving object through pattern matching in an area which is extended by a predetermined offset from the moving object's area detected in the previous image, using the appearance model, wherein the moving object is not detected.

10. A terminal for detecting and tracking a moving object using real-time camera motion estimation, comprising:

a camera unit for capturing an image using a lens and an image sensor;

a controller for controlling components of the terminal; and a moving object detecting and tracking unit including, a feature extractor for generating a feature map representing a change in an image pattern in an input image and extracting feature information of the image;

a global motion estimator for estimating a global motion for recognizing a motion of a camera using the extracted feature information; and a moving object extractor for correcting the input image by reflecting the extracted global motion, and detecting a moving object by comparing a previous image with a current image in the corrected input image, wherein the feature extractor creates a feature map in a remaining part except for an extracted area of the moving object.

11. The terminal of claim 10, wherein the feature extractor generates a feature map marking pixels, a change of each of which with neighbor pixels is greater than a predetermined threshold in the image, and extracts the feature information from the feature map.

12. The terminal of claim 11, wherein the feature extractor creates a feature map in a part obtained by excepting an area of a predetermined size from a center of a first input image, and creates a feature map in a remaining part except for an extracted area of a moving object starting from a second input image, to generate a feature map.

13. The terminal of claim 10, wherein the global motion estimator divides pixel areas marked such that a change with neighbor pixels is greater than a predetermined threshold in the feature map, into feature blocks having a predetermined size of N*N, the pixel areas, further divides each of the divided feature blocks into sub-blocks having a predetermined size of S*S, sets a sum of pixel values belonging to each sub-block included in each feature block as a representative value of the sub-block, sets a sub-block having a greatest representative value among the sub-blocks as a macro block of the feature block to which the sub-block belongs, and estimates a global motion by matching macro blocks in each feature block obtained in the previously input image, to a current image.

14. The terminal of claim 13, wherein the moving object extractor corrects the previously input image by reflecting the estimated global motion, remove noises by applying an averaging filter to the corrected previous image and the current image, calculates a difference image expressed in a binary signal by matching the noise-removed corrected previous image with the current image, and detects an area of the moving object by removing noises by applying an erosion operator to the calculated difference image.

15. The terminal of claim 14, wherein applying an averaging filter comprises setting a central pixel value of a block having a predetermined size of M*M to an average of other neighbor pixels in the difference image, and performing filtering such that M*M blocks do not overlap in the difference image.

16. The terminal of claim 14, wherein to calculate a difference image expressed in a binary signal by matching the noise-removed corrected binary image with the current image, the moving object extractor calculates an image difference between the corrected previous image and the current image about each of brightness information and color information, and marks pixels whose image difference about brightness information is greater than a predetermined reference image difference about brightness information, or whose image difference about color information is greater than a predetermined reference image difference about color information.

17. The terminal of claim 14, wherein once a first area of a moving object is calculated, the moving object extractor detects an area of the moving object by a difference image only in an area whose horizontal and vertical pixel lengths are extended by a predetermined offset from the detected area of the moving object in the next input image.

18. The terminal of claim 14, further comprising:
   an appearance model generator for generating an appearance model by accumulating the detected area of the moving object; and
a moving object tracker for tracking, if the moving object is not detected, the moving object through pattern matching in an area which is extended by a predetermined offset from the moving object's area detected in the previous image, using the appearance model.

\* \* \* \* \*